(12) United States Patent
Walker (10) Patent No.: US 8,645,758 B2
(45) Date of Patent: Feb. 4, 2014

(54) DETERMINING PAGE FAULTING BEHAVIOR OF A MEMORY OPERATION

(75) Inventor: Paul Michael Peter Brian Ronald Walker, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 13/036,789

(22) Filed: Feb. 28, 2011

(65) Prior Publication Data

US 2011/0271170 A1    Nov. 3, 2011

(30) Foreign Application Priority Data

Apr. 29, 2010    (EP) .................................... 10161500

(51) Int. Cl.
    *G06F 11/00*    (2006.01)
(52) U.S. Cl.
    USPC ............... 714/28; 714/6.1; 714/42; 714/47.1
(58) Field of Classification Search
    USPC ............ 714/2, 6.1, 15, 16, 20, 25, 27, 28, 32, 714/38.1, 42, 47.1, 51
    See application file for complete search history.

(56) References Cited

U.S. PATENT DOCUMENTS

| | | | | |
|---|---|---|---|---|
| 2002/0092002 | A1* | 7/2002 | Babaian et al. | 717/137 |
| 2006/0253691 | A1* | 11/2006 | Barraclough et al. | 712/244 |

* cited by examiner

*Primary Examiner* — Joseph D Manoskey
(74) *Attorney, Agent, or Firm* — David W. Victor; Konrad, Raynes, Davda and Victor LLP (57) ABSTRACT

Embodiments of the invention relate to page faulting of memory operations in a subject code block. An aspect of the invention concerns an apparatus comprising a component for identifying a first object node having a first dependency path and second object node having a second dependency path, and a component for calculating a numerical difference between a first addressing value and a second addressing value, where the first and second addressing values are respectively associated with the first and second dependency paths. The apparatus may include a dependency generator for ordering a subject order list of the subject code block in an object dependency non-page-faulting order when the numerical difference is equal to or less than an assigned memory page size.

20 Claims, 9 Drawing Sheets

DETERMINING PAGE FAULTING BEHAVIOR OF A MEMORY OPERATION

Embodiments of the invention relate generally to computer emulators and translators. In particular, the embodiments of the invention relate to analyzing the address space of a sequence of memory operations to determine whether a later memory operation to a first memory operation will fault in a computer emulator.

BACKGROUND

Often it is desired to run program code written for a computer processor of a first type (a subject processor) on a processor of a second type (a target processor). An emulator or translator may be used to perform program code conversion, such that a subject program (subject code) is able to run on the target processor.

When the translator is dynamically translating a subject program of a subject processor to a target processor, the translator must ensure that synchronous page faults occur in the same order that the subject program would have produced them when running on the subject platform.

One possible approach is to force the scheduled target code to order page faulting operations in the same order as they would appear in the subject program. However, this approach results in sub-optimal target code quality when the subject and target architectures are substantially different, e.g., the target architecture has different memory bandwidth and instruction groupings when compared to the subject architecture.

BRIEF SUMMARY

A first exemplary embodiment of the invention provides an apparatus for determining the page faulting behavior of at least two memory operations from a sequence of memory operations of a subject code block. The apparatus may comprise an inspector component for identifying from the intermediate representation and a subject order list a first object node having a first dependency path and second object node having a second dependency path. The inspector component may identify from the first and second dependency paths, a first addressing value associated with the first dependency path and a second addressing value associated with the second dependency path. The apparatus may include a calculation component for calculating a numerical difference between the first addressing value and the second addressing value, and determining whether the calculated numerical difference is less than or equal to a memory page size assigned by an operating system. The apparatus may comprise a dependency generator for ordering the subject order list in object dependency non page faulting order, in response to the determined difference associated with the first addressing value and the second addressing value being equal or less that the assigned memory page size.

Another aspect of the invention concerns a method for determining the page faulting behavior of at least two memory operations from a sequence of memory operations of a subject code block. The method may comprise identifying from the intermediate representation and a subject order list, a first object node having a first dependency path and second object node having a second dependency path. The method may comprise identifying from the first and second dependency paths, a first addressing value associated with the first dependency path and a second addressing value associated with the second dependency path. The method may further comprise calculating a numerical difference between the first addressing value and the second addressing value and determining whether the calculated numerical difference is less than or equal to a memory page size assigned by an operating system. In response to the numerical difference being equal or less that the assigned memory page size, the method may order the subject order list in object dependency non-page faulting order.

A further aspect of the invention concerns a computer program product for determining the page faulting behavior of at least two memory operations. The computer program product comprises a computer readable storage medium having computer readable program code embodied therewith and when loaded into a computer system and executed, perform all the steps of the method as described above.

The details of the preferred embodiments of the invention, both as to its structure and operation, are described below in the Detailed Description section in reference to the accompanying drawings. The Summary is intended to identify key features of the claimed subject matter, but it is not intended to be used to limit the scope of the claimed subject matter.

BRIEF DESCRIPTION OF THE SEVERAL VIEWS OF THE DRAWINGS

Embodiments of the invention will now be described, by means of example only, with reference to the accompanying drawings in which.

DETAILED DESCRIPTION

Figure 1:
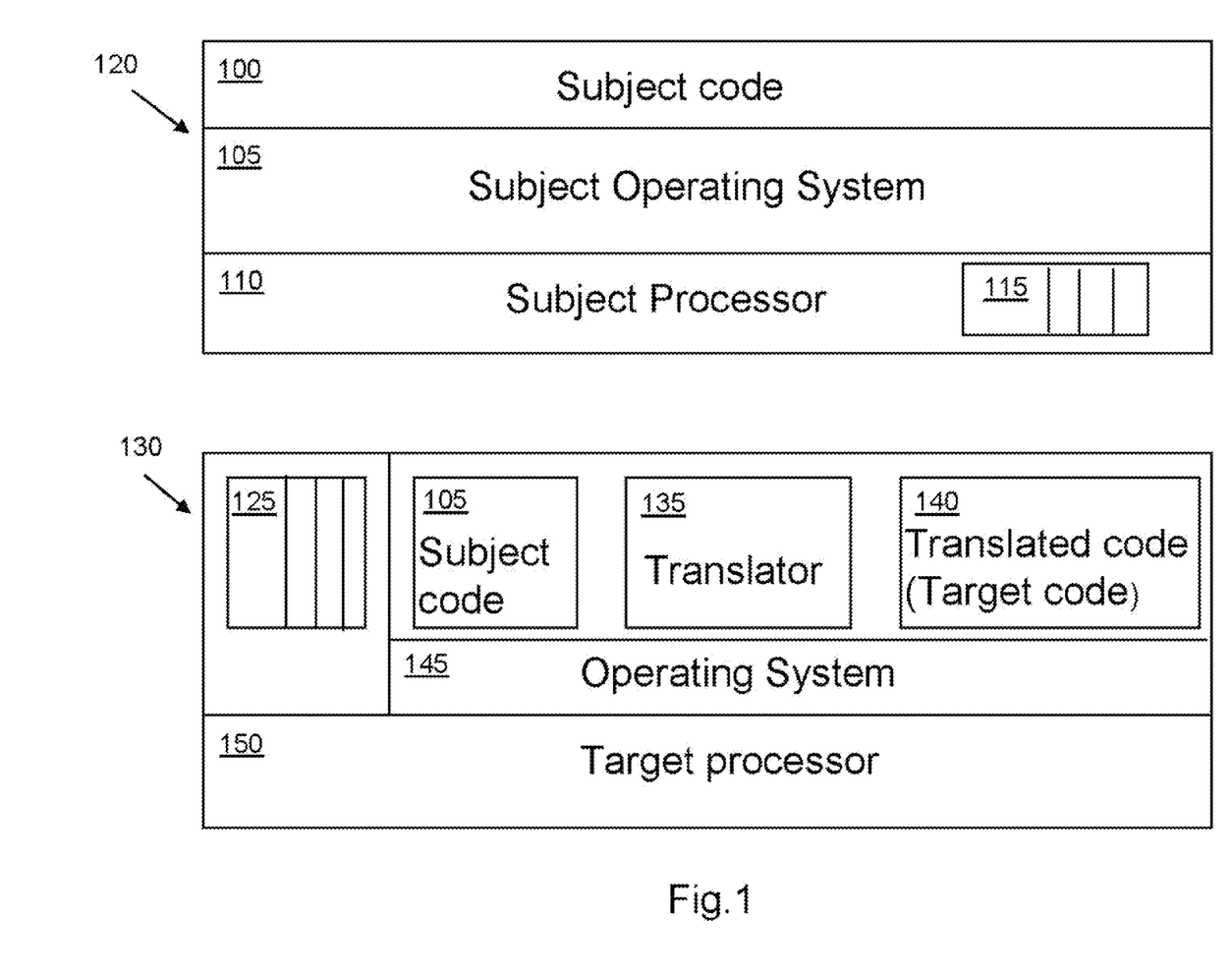
FIG. 1 is a schematic diagram of an apparatus in which embodiments of the invention may be provided, in accordance with aspects of the invention.

Referring to FIG. 1, there is illustrated a subject code 100 executing on a subject computing platform 120 having a subject processor 110. In some instances, it may be desirable to have a target computing platform 130 execute the subject code 105 through a translator 135 which performs program code conversion. The translator 135 performs code conversion from the subject code 105 to target code 140, such that the target code 140 is executable on the target computing platform 130.

The subject processor 110 may comprise a set of subject registers 115. A subject register 115 may interface with memory for holding the subject code 100 and a subject operating system 105. Similarly, a target computing platform 130 may comprise a target processor 150 having a plurality of target registers 125 and a memory (not shown) to store a plurality of operational components including a target operating system 145, the subject code 100, the translator 135 and the translated target code 140. The target computing platform 130 is typically a microprocessor based computer or other suitable computer.

In one embodiment, the translator 135 is an emulator to translate subject code 100 of a subject instruction set architecture (ISA) into translated target code 140 of another ISA with or without optimization. In another embodiment, the translator 135 functions as an accelerator for translating subject code 100 into target code 140, each of the same ISA, by performing program code optimizations.

The target code 140 is a suitably compiled version of source code 100 implementing the translator 135, and runs in conjunction with the operating system 145 on the target processor 150. It will be appreciated that the apparatus illustrated in FIG. 1 is exemplary only and that, for example, software, methods and processes according to embodiments of the invention may be implemented in code residing within or beneath an operating system 105, 145. The subject code 100, target code 140, operating system 145 and storage mechanisms of the memory may be any of a wide variety of types, as known by those skilled in the art.

Program code conversion is performed dynamically, at run-time, to execute on the target architecture while the target code 140 is running. That is, the translator 135 runs inline with the translated target code 140. Running the subject program through the translator 135 involves two different types of code that execute in an interleaved manner, i.e., the subject code 100 and the target code 140. Hence, the target code is generated by the translator 135 and the translator's embedded functions and operations, through run-time, based on the subject code 100 of the program being translated.

In one embodiment of the invention, the translator 135 emulates relevant portions of the subject architecture such as the subject processor 110 and particularly the subject registers 115, while executing the subject program as target code 140 on the target processor 150. A representation of a subject state is provided by components of the translator 135 and the target code 140. That is, the translator 135 stores the subject state in a variety of explicit programming language devices such as variables or objects. The translated code 140 by comparison provides subject processor state implicitly in the target registers 135 and in memory locations which are manipulated by the target instructions of the target code 140.

Figure 2:
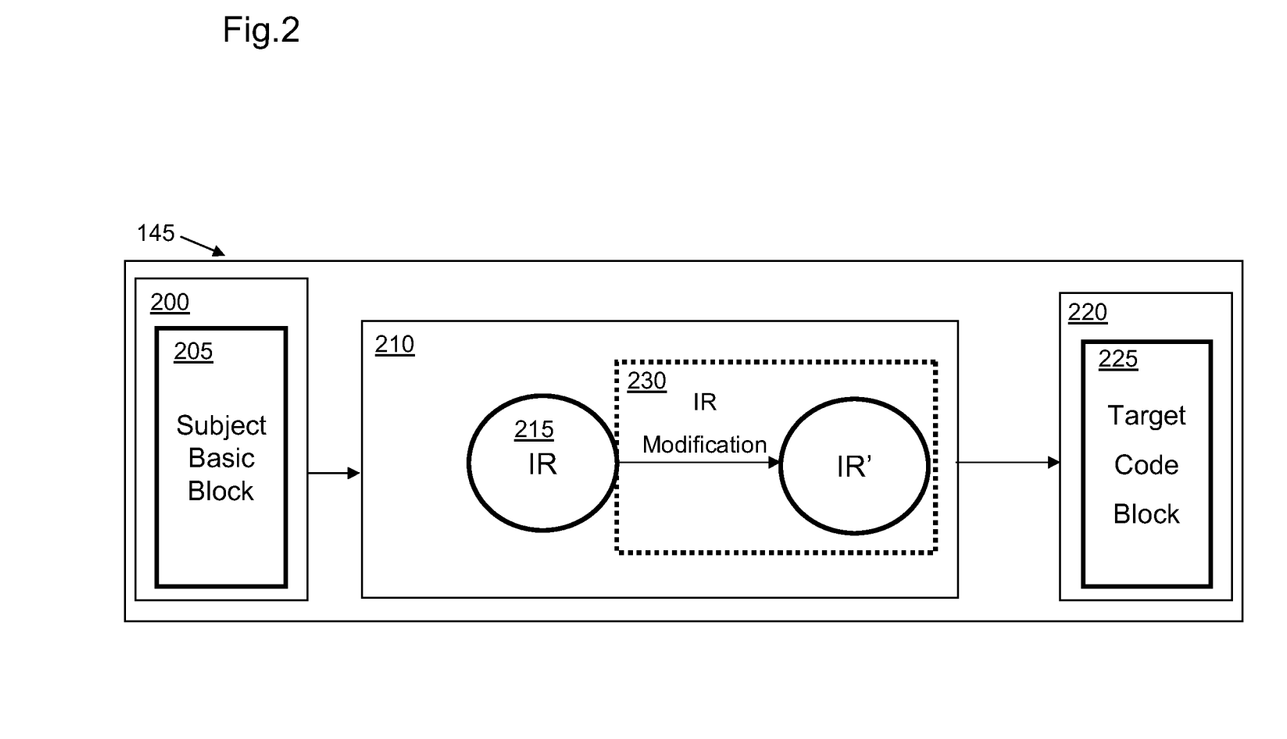
FIG. 2 is a schematic diagram of a translator apparatus in which exemplary embodiments of the invention may be provided.

FIG. 2 illustrates the process flow of an exemplary translation process. A subject basic block 205 may be a section of subject code 100 with exactly one entry point and exactly one exit point, which limits the subject basic block 205 to a single control path. For this reason, subject basic blocks 205 are a useful fundamental unit of control flow. Thus, the translator 135 may divide the subject code 100 into a plurality of subject basic blocks 205, where each subject basic block 205 is a sequential set of instructions between a first instruction at a single entry point and a last instruction at a single exit point.

The translator 135 may select just one of these subject basic blocks 205 or select a group of subject basic blocks 205. A group of subject basic blocks 205 may suitably comprise two or more basic blocks which are to be treated together as a single unit.

In an exemplary embodiment, an intermediate representation (IR) 215 is generated based on a subject instruction sequence, as part of the process of generating the target code 140 from the original subject code 100. An intermediate representation 215 is an abstract representation of the expressions calculated and operations performed by the subject code 100. Target code 140 is generated based on an intermediate representation 215.

An intermediate representation 215 is typically represented as a collection of data tree structures and in the form of directed acyclic graphs. A directed acyclic graph typically comprises more than one path from the start to the terminals of the graph. Directed acyclic graphs have the advantage of saving space in memory when compared to other tree structures where there is one path from start to a terminal. There are many different types of intermediate representations including but not limited to abstract syntax trees, directed acyclic graphs, etc.

An intermediate representation (IR) 215 may be generated by an IR constructor 210 in combination with an expression interface 230. The expression interface 230 may comprise functions for every subject instruction that specifies how they should be represented within the intermediate representation.

In one embodiment, the translator 135 may be implemented using an object-orientated programming language such as C++. An intermediate representation node may be implemented as a C++ object and references to other nodes may be implemented as C++ references to the C++ objects corresponding to those other nodes. An intermediate representation may be implemented as a collection of object nodes, containing various references to each other.

The translator 135 may comprise a decoder 200 which decodes a requested section of the subject code 100 to provide a plurality of subject basic blocks 205. The translator 135 may also provide decoder information in relation to each subject basic block 205 and the subject instructions contained therein which will assist the later operations of the translator 135.

An encoder 220, as part of the back end of the translator 135, generates target code blocks 225 executable by the target processor 150. Target code blocks 225 are generated to perform work in the target platform 130 equivalent to executing the subject basic blocks 205 on the subject platform 120. Each subject basic block 205 has a single entry point and is executed in such a way that a fault will cause the remainder of the target code block 225 to be skipped. The encoder 220 may generate header code and/or footer code for some or all of the target code blocks 225 which performs functions such as setting the environment in which the target code block 225 will operate and passing control back to the translator 135 where appropriate.

Intermediate representation 215 generation uses a set of abstract register definitions which correspond to specific features of the subject architecture upon which the subject code 100 is intended to run. For example, there may be a unique abstract register definition for each physical register on the subject architecture. Abstract register definitions in the translator 135 may be implemented as a C++ object which comprises references to an intermediate representation object. An intermediate representation 215 and other processes suitably form part of the translator 135. An intermediate representation is a machine and language independent version of the subject code 100 of the subject processor 110.

Figure 3A:
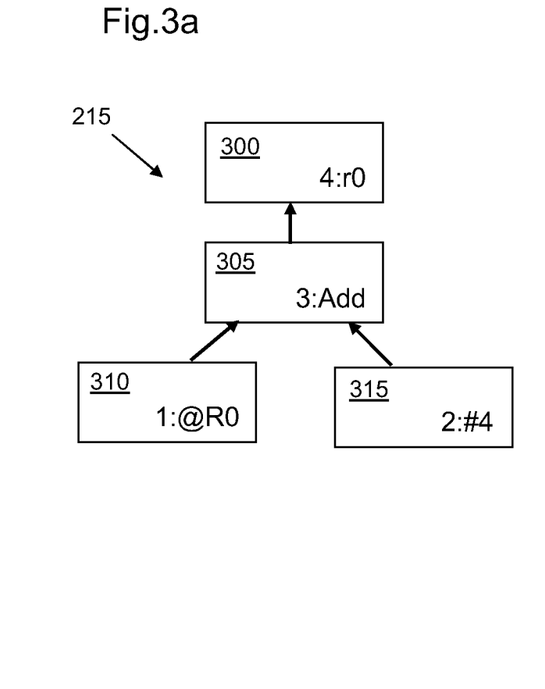
FIGS. 3a and 3b are block diagrams illustrating examples of intermediate representations of program code blocks.
Figure 3B:
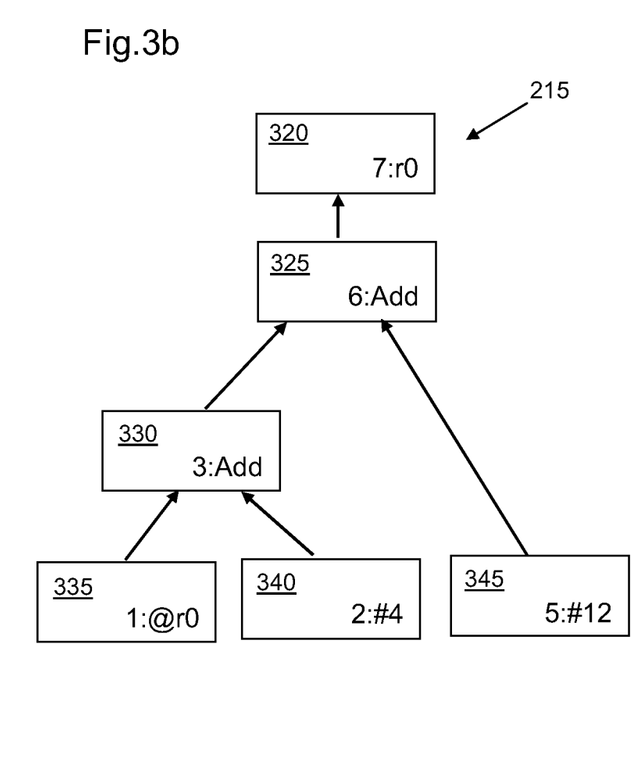
Figure 4:
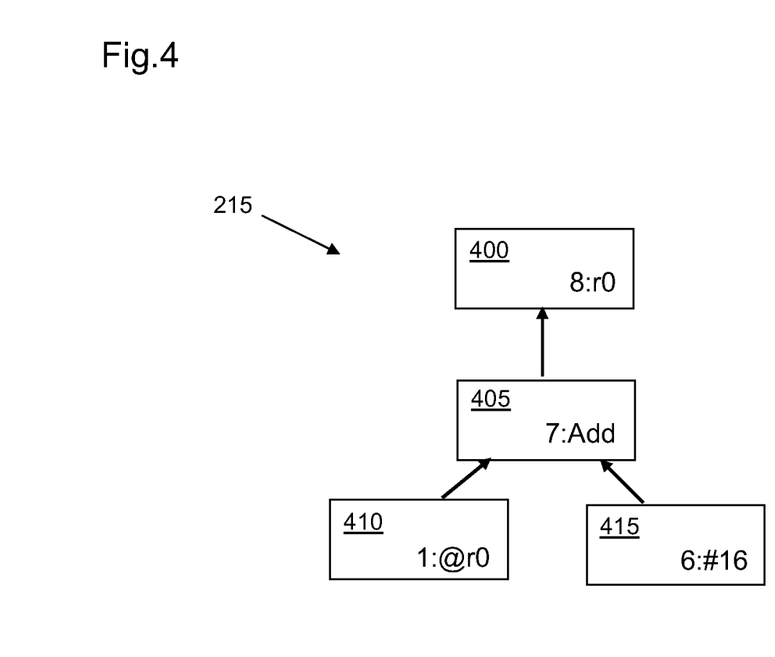
FIG. 4 is a block diagram illustrating an optimized intermediate representation.

An example of a simplified intermediate representation 215 is shown in FIGS. 3a, 3b and 4. The intermediate representation 215 is in the form of a directed acyclic graph. The graph comprises a number of nodes 300-315, 320-345 and 400-415. A node can be thought of as a data structure, wherein each node 300-315, 320-345 and 400-415 represents an element of a subject instruction sequence.

A subject instruction sequence is decoded by a decoder 200 from the subject code 100 having a subject language into a machine independent language. The machine independent language expresses operation of a target processor 150 and is independent of any particular language of the target processor 150 and independent of any source language. For example, if the language of the subject machine is C++, then the intermediate representation allows for the individual operations of the C++ language to be represented in an abstract machine independent language. Such a representation allows an encoder to encode the intermediate representation into a language that can be understood by the target machine, for example target platforms, such as Sparc (a trademark of Sun Microsystems in the US and other countries), Pentium (a trademark of Intel Corporation in the US and other countries), and Power7 (a trademark of IBM Corporation in the US and other countries), etc.

Although the intermediate representations 215 of FIGS. 3*a*, 3*b* and 4 are shown as directed acyclic graphs, a person skilled in the art will appreciate that the embodiments of the invention are applicable to any form of hierarchical data structure that can be used to represent an intermediate representation.

FIG. 3*a* illustrates an example of an intermediate representation 215. The intermediate representation 215 comprises four object nodes 300 to 315. Each object node 300 to 315 is a data structure that describes an operation of a subject instruction sequence. Thus, each data structure has its own type, size and a list of inputs and the inputs are pointers to other data structures or constant values.

The intermediate representation 215 illustrates the data flow through the subject instruction sequence of 'r0=r0+4'. This subject instruction sequence comprises the following:

one subject register read, i.e., node_1:r0 (310)
    one constant value, i.e., node_2: #4 (315)
    one add operation, i.e., node_3: Add (305)
    one subject register write, i.e., node_4:r0 (300)

As an illustration, each object node 300 to 315 comprises a numerical value preceding the colon which is the object node's sequence number and is incremented for each object node created in the parsing of the subject instruction sequence 'r0=r0+#4'.

For example, the first object node to be created is object node_1 (310) comprising the expression '@r0' which is a subject register read for the register 'r0', next object node_2 (315) is created for the constant value '4'. The expression '@r0' refers to the IR graphs in FIG. 3*b* and FIG. 4, and represents the value of the subject register 'r0' when entering the basic block of the subject instructions represented by the IR graphs.

Both object node_1 (310) and object node_2 (315) have an input into object node_3 (305). Object node_3 (305) is an 'add operation' which adds the contents of the subject registers of object node_1 (310) and object node_2 (315). The last object node, node_4 (300), is a subject register write of the result produced by node_3 (305).

FIG. 3*b* illustrates another example of an intermediate representation 215. In this example an additional subject instruction sequence, namely, 'r0=r0+12' is decoded. It can be seen that an additional node, node_5 (345), is created to hold the constant value '12'. The constant value '12' needs to be added to data structure 'r0', thus an additional node_6 (325) having an 'add operation' is created to add the constant value '12' to the subject register 'r0'.

When the second instruction, 'r0=r0+12', is being decoded by the IR constructor 210, the IR constructor 210 requests that the expression interface 230 generates an 'add operation' and specifies node_3 (330) and node_5 (345) as its operands. Further examination of these nodes 330, 345 identifies that node_3 (330) is an add function and node_5 (345) is a constant. Further analyses of each of the identified nodes' dependencies identify that node_2 (340) is also a constant. Thus the expression interface 230 can optimize the intermediate representation 215 as shown in FIG. 4.

FIG. 4 is an example of an optimized version of the intermediate representation 215 of FIG. 3*b*. As explained, because node_6 (415) receives as input an 'add operation' from node_3 (330) and node_3 (330) receives as input a constant value from node_2 (340), it is possible to optimize the intermediate representation 215 of FIG. 3*b* by adding the two constant values together. This optimization removes object node_2 (340), object node_3 (330) and object node_5 (345) and creates a new object node_6 (415) and a new add node, node_7 (405).

However, this form of optimization does not take into account the respective memory addresses of memory operations to allow a determination of whether a memory operation will page fault or not.

Figure 5:
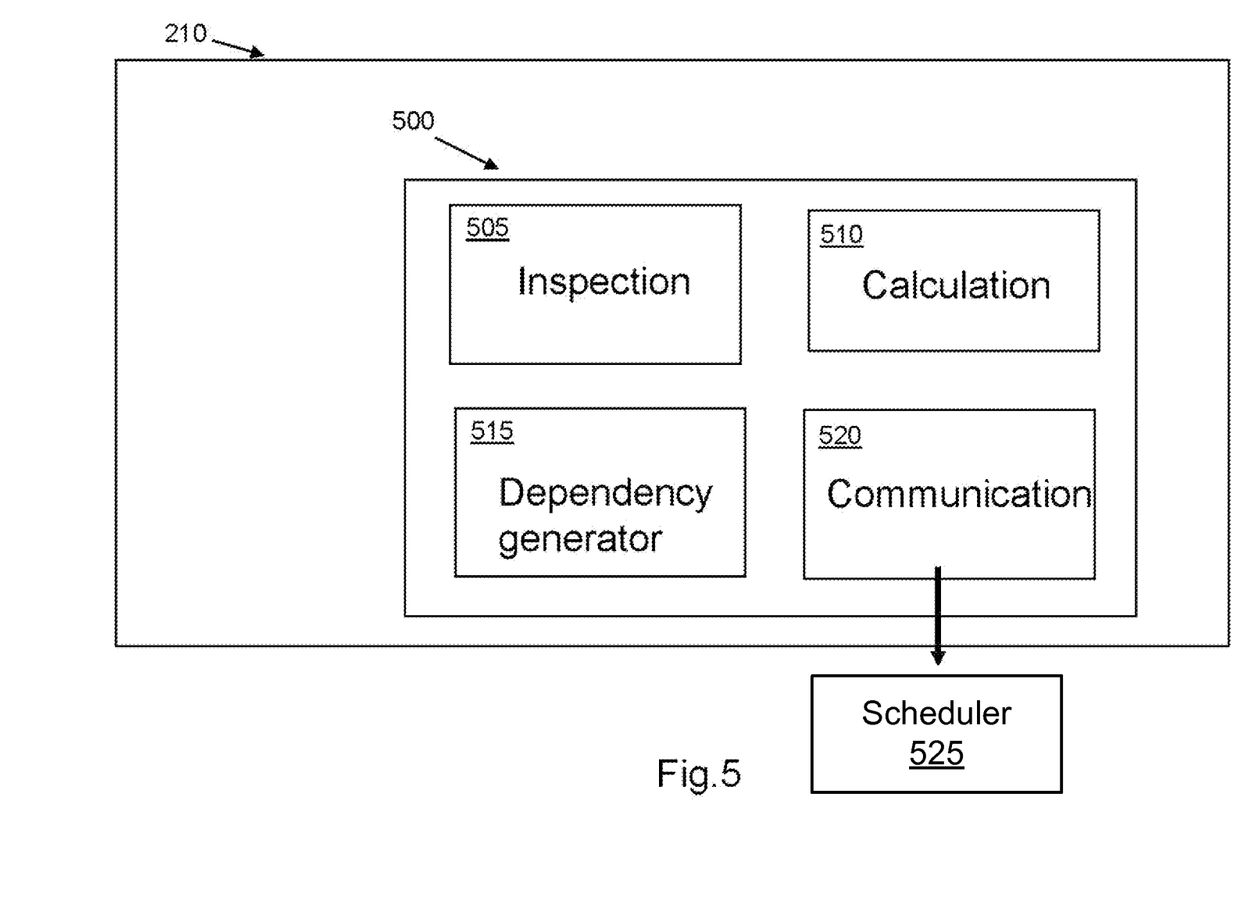
FIG. 5 is a schematic diagram showing the components of a modified expression interface in accordance with an exemplary embodiment of the invention.

FIG. 5 illustrates an exemplary system embodiment of the present invention. FIG. 5 should be read in combination with FIG. 6 which illustrates exemplary operations performed by the translator system in FIG. 5. The translator system in FIG. 5 may include a modified expression interface 500 which is operable with an intermediate representation (IR) constructor 210. The behavior of the intermediate representation (IR) constructor 210 has already been explained with reference to FIG. 2. The modified expression interface 500 may comprise a number of components which interface and interact with each other to provide the advantages and benefits of the present invention.

The modified expression interface 500 may comprise an inspection component 505 for inspecting an intermediate representation 215 as generated by the IR constructor 210, and a dependency generator component 515 for generating a subject order list ordered by non-faulting memory page dependency from an intermediate representation 215. The modified expression interface 500 may include a calculation component 510 for analyzing a generated subject order list and the intermediate representation 215 to calculate a numerical difference between two address value. The calculation component 510 may further determine whether the numerical difference is equal to or less than a memory page size as assigned by the operating system. A communication component 520 of the modified expression interface 500 may transmit the ordered subject order list to a scheduler component 525 for processing before sending it to the encoder component for processing the target code blocks 225.

The modified expression interface 500 communicates and is operable for use with the IR constructor 210. The modified expression interface 500 in combination with the IR constructor 210 reads an subject instruction sequence of a subject code block 205 (per step 600 of FIG. 6) and generates an intermediate representation 215 and a subject order list of the subject basic block (step 605).

Figure 6:
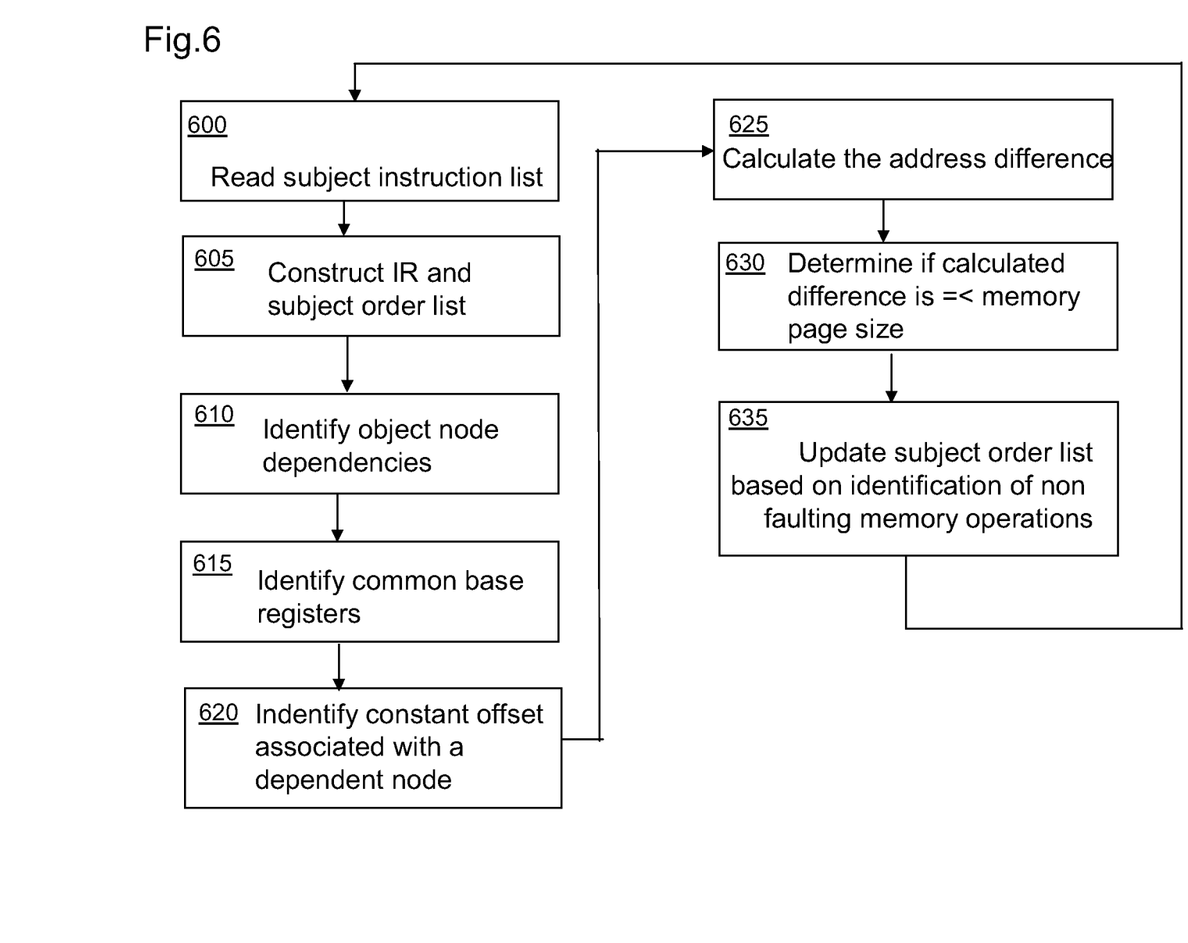
FIG. 6 is a flow chart detailing the process steps of the modified expression interface of FIG. 5, in accordance with an exemplary embodiment of the invention.

The inspection component 505 inspects the subject order list to identify the object nodes listed in a linear dependency order. For each one of these object nodes, the inspection component 505 identifies a dependency path associated with each of the identified object nodes from the intermediate representation 215 (step 610). An example of this may be to identify a load operation and the load operation's dependent object nodes. However, a person skilled in the art will appreciate that the steps of the present invention are operable for use with any form of memory instruction and is not limited to load instructions.

For each of the identified load nodes, the inspection component 505 identifies a common base register and a constant offset value associated with an operand object node (steps 615 and 620).

A calculation component 510 receives this information and performs a calculation to determine the difference between the addresses of the two load nodes (step 625). In one embodiment, a memory address assignment derives the address of an item in memory from the value of common base register and a constant offset value, i.e., the value of the base register plus an offset addressing scheme. For example, when a register and a constant are supplied, the address is the sum of the assigned constant plus the value held within the register at the time a memory operation is executed. However, a person skilled in the art will appreciate that any suitable memory addressing scheme can be used.

The calculation component 510 determines whether a latter memory operation is preceded by two or more other memory operations; such that, the latter memory operation shares the same memory page as either or both preceding memory operations. This is achieved by the above components interacting with each other in order to identify a dependency path of an object node, identifying a common base register and an address value associated with the dependency path. For any two dependency paths that share the same common base register, a numerical difference between the address values is calculated and the calculated value is then identified as being equal to or less than a memory page size as assigned by an operating system.

Once the numerical difference has been calculated, the calculation component 510 determines whether the calculated difference is equal to or less than the memory page size assigned by the operating system (step 635).

A person skilled in the art will appreciate that memory used by an operating system is typically divided into a number of units called pages. For example a 24-bit address can be split into an 8-bit page number and a 16-bit location within a page providing 256 pages of 64K bytes. Thus the calculated numerical difference is determined as whether being equal to or less than the page size assigned by the operating system.

If the calculated difference is determined as being equal to or less than the assigned memory page size then the dependency generator component updates the subject order list showing the node dependencies based on identification of non faulting memory operations.

A dependency generator component 515 generates an optimized subject order list in which object nodes are ordered by object node dependency and non page faulting behavior, i.e., a dependent memory operation shares the same memory page.

The communication component 520 may transmit the ordered non faulting dependency subject order list to the scheduler 525 for processing. The scheduler 525 analyses the received subject order list and determines an execution order of each of the nodes based in the information supplied within the subject order list. The order of execution, based on non-page faulting order, is communicated to the encoder 220 for executing on the target platform 130.

As previously explained, an intermediate representation 215 may be built by repeated calls from the IR constructor 210 to the modified expression interface 500. A subject order list is generated by the modified expression interface 500 at the same time as the intermediate representation 215 is being generated. The subject order list comprises a sequential list of subject operations that need to be performed in a particular order.

Figure 7:
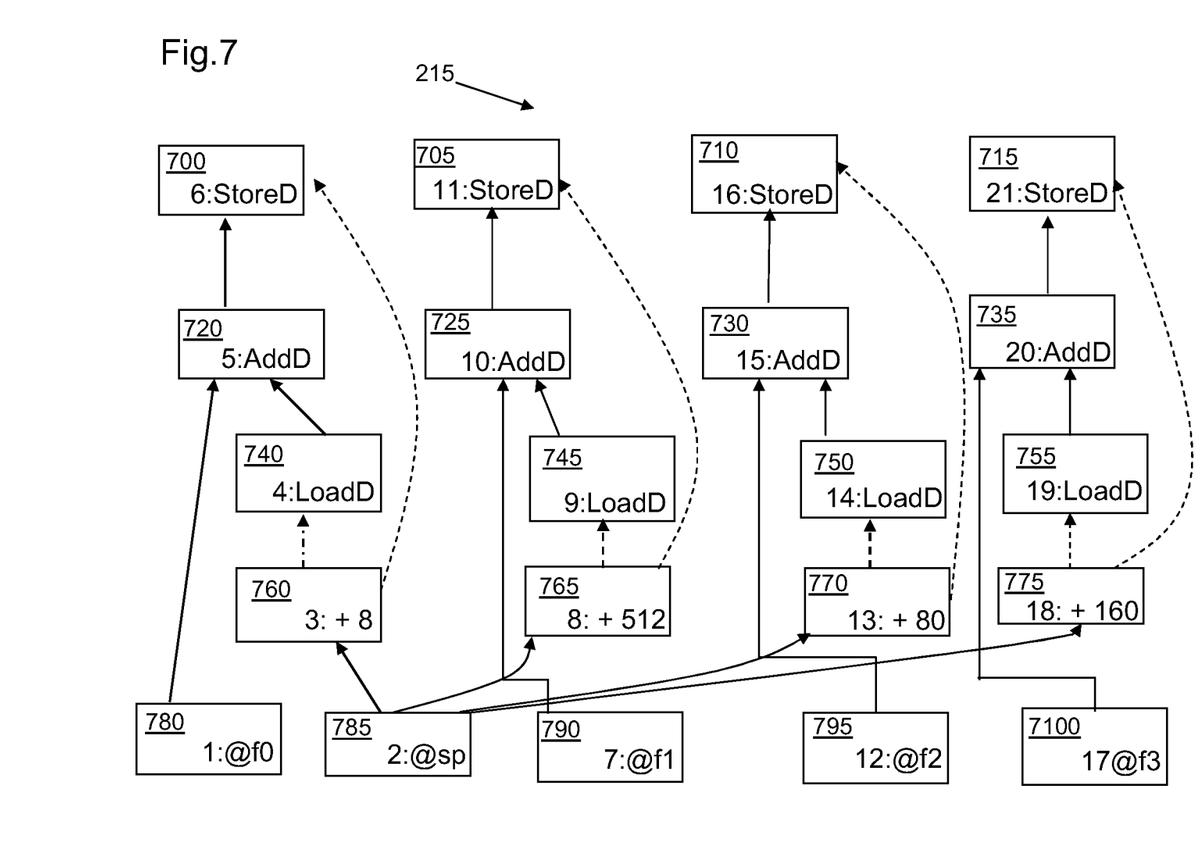
FIG. 7 is a schematic diagram illustrating an intermediate representation in accordance with an exemplary embodiment of the invention.
Figure 8:
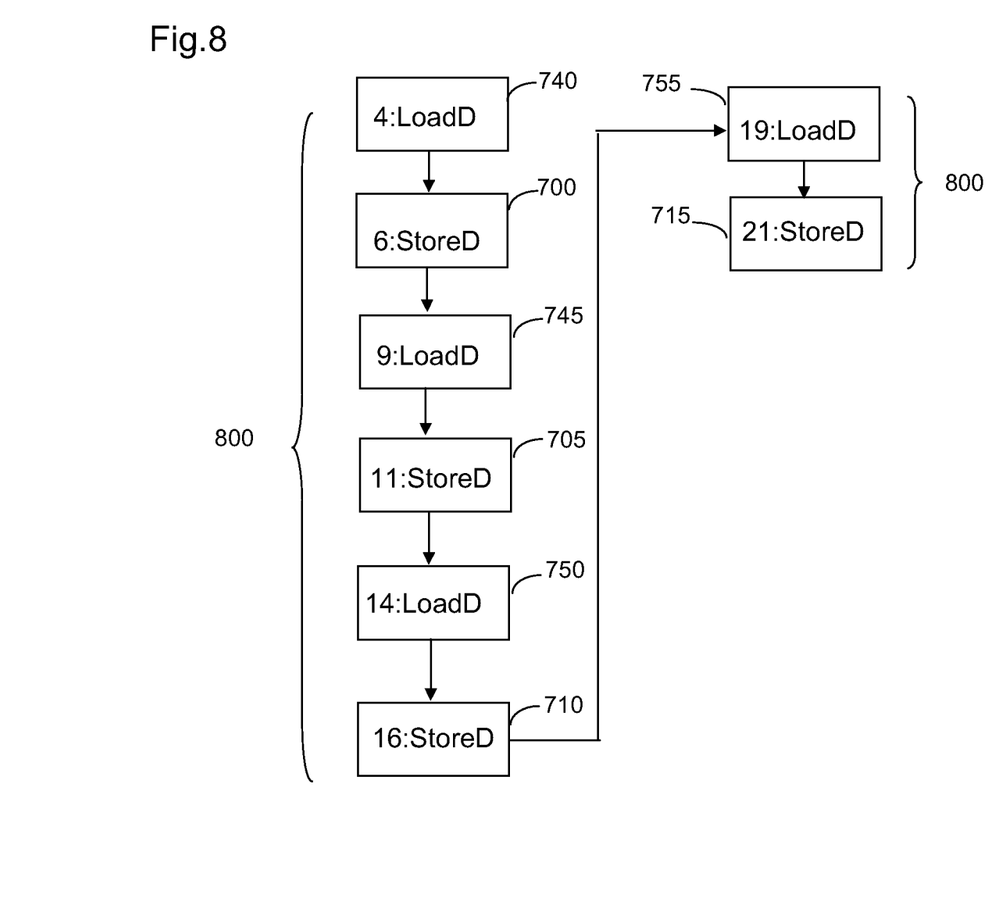
FIG. 8 is a schematic diagram illustrating a subject order list in accordance with an exemplary embodiment of the invention.

FIG. 8 illustrates an example of a subject order list 800 generated in association with the intermediate representation 215 of FIG. 7, in accordance with an embodiment of the invention. The intermediate representation 215 of FIG. 7 is created in response to the decoding of the following four subject instruction sequences:

addsd f0, 8(SP)
addsd f1, 512(SP)
addsd f2, 80(SP)
addsd f3, 160(SP)

A person skilled in the art will appreciate that the above instruction sequence sets perform operations such as reading 64 bit double precision value from memory, adding the value to the 64 bit double precision value within register f0, storing the value result to memory.

In this example, the intermediate representation 215 comprises a number of storage nodes 700-715 and a dotted line in FIG. 7 represents a memory address which the storage operation reads from or writes to.

The modified expression interface 500 controls the updating of the subject order list 800 as operations are required to be completed and further operations are queued to be completed. The subject order list 800 denotes a chain of subject operation dependencies, i.e., a linear list. For example, subject operation '4':LoadD (740) must take place before subject operation '6':StoreD (700) and so on.

According to an embodiment of the invention, the inspection component 505 analyses each object node of the subject order list 800 in combination with the associated intermediate representation 215 in order to identify object node dependencies.

Preferably, the inspection component 505 comprises a number of functions which can iterate over a subject order list 800 and inspect each of the object nodes 705 to 740 to determine dependent nodes and associated memory address assignments.

The inspection component 505 inspects each of the object nodes and determines from the intermediate representation 215 a node dependency path for each of the object nodes in the subject order list. In the example of FIG. 7, the intermediate representation 215 comprises additional information such as a representation of the address to be accessed which in this case includes constant offsets extracted from the original decoded subject instructions. In the particular example, the constant offset is provided by the original subject instruction and passed to the decoder 200 for passing onto the IR constructor 210 for analyzing The constant offset values are shown in node_3 (760), node_8 (765), node_13 (770) and node_18 (775) of FIG. 7.

FIG. 7 also illustrates a number of store nodes (700, 705, 710, 714), load nodes (740, 745, 750, 755), add operation nodes (720, 725, 730, 735) and register read/write nodes (780, 785, 790, 795, 7100).

Working through the example of FIG. 7 and given the scenario of the encoder being instructed to reconstruct the object node dependency path of node_14 (750), the inspection component 505 reverse iterates over the subject order list 800 and determines an object node dependency path of node_4 (740), node_6 (700), node_9 (745) and node_11 (705).

Having identified the above information, the inspection component 505 inspects each one of the object nodes, and with reference to the intermediate representation 215 of FIG. 7, determines which dependent object nodes provide input into each of the object nodes identified in the dependency path, i.e., what input is required by an object node in order for it to calculate the address of its memory operation. Thus, using the sample of the subject order list of FIG. 8, the following expanded object node dependency path for node_14 (750) is identified by the inspection component. The symbol "===" means "corresponding to".

load===node_4 (740) has address input===node_3 (760)===node_2 (785)+8
store===node_6 (700) has address input===node_3 (760)===node_2 (785)+8
load===node_9 (745) has address input===node_8 (765)===node_2 (785)+512
store===node_11 (705) has address input===node_8 (765)===node_2 (785)+512 and for the requested node_14 (load node)(750), the inspection component 505 returns:

expression in input===node_13 (770)===node_$_{2+}$80 (785)

The calculation component 510 analyses the above information and determines that both of the load operations associated with node_4 (740) and node_9 (745) share the same common base register, i.e., base register node_2 (785). However, due to the nature of the translator 135 the value of the base register is not known during translation, but the calculation component 510 is able to identify the constant offset value associated with each of the object nodes. The modified expression interface 500 identifies a constant offset value for node_4 (740) as the value '8' and the constant offset value for node_9 (745) as being of the value of '512'.

The calculation component 510 identifies the common base register (node_2)(785) associated with two load operations, namely node_4 (740) and node_9 (745). Node_2 (785) is a register that will hold a value 'X' but at this time it is not known what value 'X' will be. Node_4 (740) receives as input an 'add operation' from node_3 (760) which states add the value of the constant offset value and the value of 'X' to the load register of node_4 (740). Node_9 (745) receives as input an 'add operation' from node_8 (705) which states add the value of the constant offset value and the value of 'X' to the load register of node_9 (745).

The calculation component 510 calculates the difference in address values between node_4 (740) and node_9 (745). The calculation component 510 takes the calculated difference and determines if the calculated difference is equal to or less than an assigned memory page size of the operating system.

The calculation component 510 may use the following algorithm to calculate the numerical difference between two address values:

Difference=(first common base register+first constant offset value)−(second common base register+second constant offset value)=(first common base register−second common base register)+(first constant offset value−second constant offset value)

Once the numerical difference has been calculated, the calculation component 510 may use the following algorithm to determine if the memory operations fall within an assigned page size.

Difference=<page size

Therefore, using the intermediate representation 215 of FIG. 6 and the algorithms above:

Difference=(node_2(value)+8)−(node_2(value)+512)=(node_2(value)−node_2(value)+(512−8)

and

504=<4 Kb (page size)

Thus, it is determined that the above memory operations utilize the same memory page and will not generate a page fault.

A common base register is generally used when multiple instructions reference the same register (object node) when performing base+offset style addressing or other similar addressing schema.

If the calculation component 510 determines that the calculated difference between address components of two memory operations is equal to or less than the page size assigned by the operating system, then the modified expression interface 500 is able to determine that the first two load operations (node_4 (740) and node_9 (745)) either access the same or consecutive memory pages. Thus, because node_14 (750) share the same base register and its offset (80') is between the value '8' and the value '512' the modified expression interface 500 is able to confirm that node_14 (750) will not fault as long as it is executed after load node_4 (740) and load node_9 (745).

Figure 9:
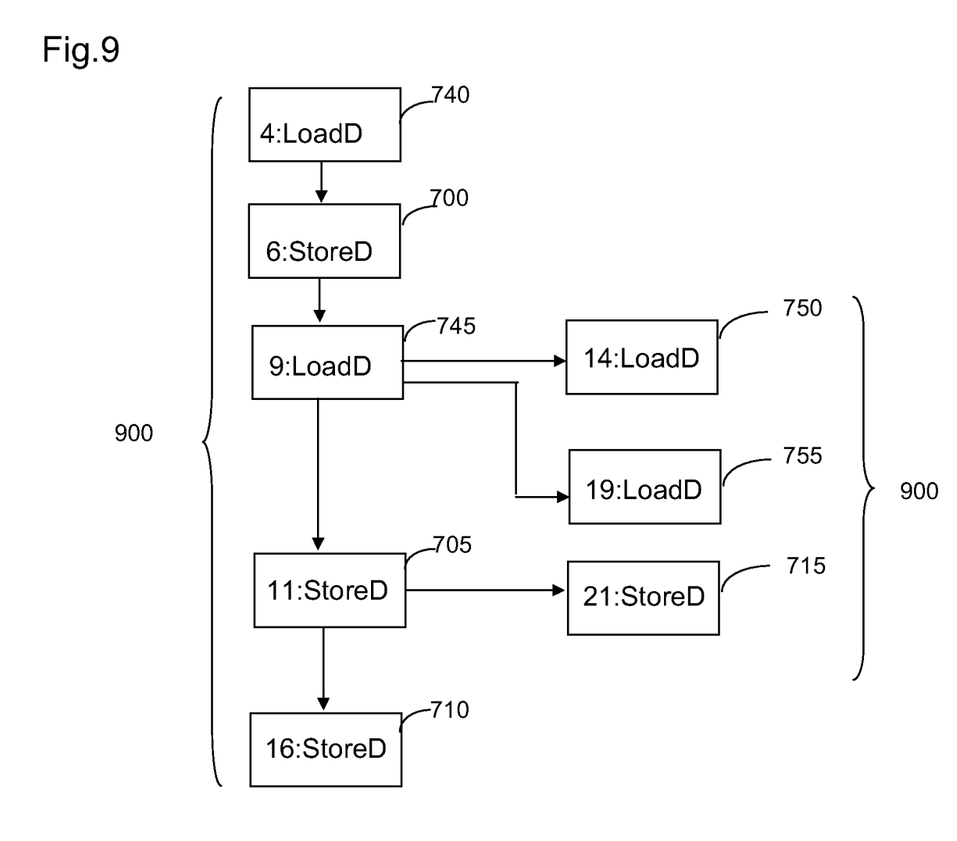
FIG. 9 is a schematic diagram illustrating a subject order list in accordance with an exemplary embodiment of the invention.

Using the above information, the dependency generator component 515 generates an optimized ordered subject order list 900. This optimized ordered subject order list 900 is shown in FIG. 9. A new dependency path is shown wherein node_9 (745) comprises dependencies node_14 (750) and node_19 (755). Node_11 (705) also comprises a dependency of node_21 (715). This means that for the reconstructed node_14 (750) that node_14 (750) can not fault as long as it is executed after node_4 (740), node_6 (700) and node_9 (745) because node_14 (750) shares the same memory page.

The same principle applies to node_19 (755). Object node_11 (705) and node_21 (715) will not page fault as long as their memory operations execute after node_4 (740), node_6 (700), node_9 (745). Thus, memory operations can be ordered in such a way that page faulting is kept to a minimum and linear dependency is substantially reduced to provide optimized code execution on the target machine. The generated subject order list 900 ordered by node dependency and non faulting memory operations is communicated to the scheduler component 525 for processing by the encoder component 220. Depending on scheduler 525 specific rules, the scheduler 525 can determine, based on the ordered subject order list 900, the order in which the subject order coded is encoded for execution of the target machine 160.

Although two types of subject order lists 800, 900 have been described, for the purposes of the invention, only one subject order list 900 needs to be generated for sending to the scheduler 525. Hence the inspection of the first subject order list to identify dependencies and the dependencies' constant offset values can be identified and calculated dynamically and the output written to an optimized subject order list 900 which is ordered in node dependency non page faulting order for communicating to the scheduler 525 for processing.

The scheduler 525 receives the created intermediate representation 215 and places all of the nodes into an additional list for processing. The scheduler 525 ensures that each node identified within the intermediate representation 215 is ordered correctly with regards to the object node dependencies identified in the generated subject order list 900. The scheduler 525 also obtains information regarding the target platform 130 which, when multiple nodes are available for selection with only a small number of object node dependencies, is used to select the most appropriate combination of object nodes for the target platform 130.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures.

As will be appreciated by one skilled in the art, aspects of the present invention may be embodied as a method, system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, Fibre Channel, Fibre Channel over Ethernet, and Infiniband, or the connection may be made to an external computer, for example, through the Internet using an Internet Service Provider.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An apparatus comprising a processor and memory to store operational components for determining page faulting behavior of at least two memory operations of a subject code block represented by an intermediate representation and a subject order list, the apparatus comprising:
   an inspector component for identifying, from the intermediate representation and subject order list, a first object node having a first dependency path and second object node having a second dependency path;
   a calculation component for calculating a numerical difference between a first addressing value and a second addressing value, the first and second addressing values respectively associated with the first and second dependency paths; and a dependency generator for ordering the subject order list in an object dependency non-page-faulting order, in response to the numerical difference being equal or less than an assigned memory page size.

2. The apparatus as in claim 1, wherein the first and second object nodes are determined as sharing a memory page in response to the numerical difference being equal to or less than the assigned memory page size.

3. The apparatus as in claim 1, further comprising a scheduler component for selecting a preferred execution order of the first and second dependency paths based on the subject order list.

4. The apparatus as in claim 1, wherein the apparatus executes the first object node before the second object node in response to the first and second object nodes sharing a memory page.

5. The apparatus as in claim 1, wherein the calculator component derives an addressing value for each of the first and second dependency paths from a common base register shared by the first and second dependency paths, and a constant offset value.

6. The apparatus as in claim 5, wherein the numerical difference is determined based on the common base register and constant offset value.

7. The apparatus as in claim 1, wherein each of the first and second dependency paths is associated with a plurality of object nodes and dependent nodes, and the dependency generator orders the subject order list based on the object nodes and dependent nodes.

8. The apparatus as in claim 1, further comprises a scheduler for receiving the ordered subject order list, and means for selecting an execution order for a target code based on the non-page-faulting order.

9. A method for determining page faulting behavior of at least two memory operations of a subject code block represented by an intermediate representation and a subject order list, the method comprising:

identifying, from the intermediate representation and subject order list, a first object node having a first dependency path and second object node having a second dependency path;

calculating a numerical difference between a first addressing value and a second addressing value, the first and second addressing values respectively associated with the first and second dependency paths; and determining whether the calculated numerical difference is less than or equal to a memory page size assigned by an operating system; and ordering the subject order list in an object dependency non-page-faulting order, in response to the numerical difference being equal or less than an assigned memory page size.

10. The method as in claim 9, wherein the first and second object nodes are determined as not sharing g a memory page in response to the numerical difference being more than the assigned memory page size.

11. The method as in claim 9, further comprises electing a preferred execution order of the first and second dependency paths as identified in the subject order list.

12. The method as in claim 9, further comprising executing a second memory operation before a first memory operation wherein the first and second memory operations are associated with a memory page.

13. The method as in claim 9, further comprises calculating an addressing value for each of the first and second dependency paths from a common base register shared by the first and second dependency paths, and a constant offset value.

14. The method as in claim 13, wherein the numerical difference is determined by calculating an addressing value based on the value held in the common base register and the constant offset value.

15. The method as in claim 9, further comprising selecting an execution order for a target code based on a non-page-faulting order.

16. A computer program product for determining page faulting behavior of at least two memory operations of a subject code block represented by an intermediate representation and a subject order list, the computer program product comprising a computer readable storage medium having computer readable program code embodied therein that executes to perform operations, the operations comprising:

computer readable program code configured to identify from the intermediate representation and subject order list, a first object node having a first dependency path and second object node having a second dependency path;

computer readable program code configured to calculate a numerical difference between a first addressing value and a second addressing value, the first and second addressing values respectively associated with the first and second dependency paths; and computer readable program code configured to order the subject order list in an object dependency non-page-faulting order, in response to the numerical difference being equal or less than an assigned memory page size.

17. The computer program product as in claim 16, wherein the first and second object nodes are determined as sharing a memory page in response to the numerical difference being equal to or less than the assigned memory page size.

18. The computer program product as in claim 16, wherein the computer program product comprises computer readable program code configured to execute the first object node before the second object node in response to the first and second object nodes sharing a memory page.

19. The computer program product as in claim 16, wherein the computer program product comprises computer readable program code configured to derive an addressing value for each of the first and second dependency paths from a common base register shared by the first and second dependency paths, and a constant offset value.

20. The computer program product as in claim 16, wherein the computer program product comprises computer readable program code configured to select an execution order for a target code based on the non-page-faulting order.

* * * * *